United States Patent
Zhang et al.

(10) Patent No.: US 8,248,384 B2
(45) Date of Patent: Aug. 21, 2012

(54) TOUCH SCREEN REGION SELECTING METHOD

(75) Inventors: Yu Zhang, Shenzhen (CN); Tay-Yang Lin, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 554 days.

(21) Appl. No.: 12/494,529

(22) Filed: Jun. 30, 2009

(65) Prior Publication Data
US 2010/0060598 A1 Mar. 11, 2010

(30) Foreign Application Priority Data
Sep. 10, 2008 (CN) .......................... 2008 1 0304448

(51) Int. Cl.
*G06F 3/041* (2006.01)
(52) U.S. Cl. ..................................... 345/173; 178/18.03
(58) Field of Classification Search .......... 345/173–178; 715/235–863; 178/18.03
See application file for complete search history.

(56) References Cited

U.S. PATENT DOCUMENTS

| | | | | |
|---|---|---|---|---|
| 5,825,352 A * | 10/1998 | Bisset et al. | .................. | 345/173 |
| 5,872,559 A * | 2/1999 | Shieh | ............................ | 345/157 |
| 7,479,948 B2 * | 1/2009 | Kim et al. | ..................... | 345/173 |
| 7,825,897 B2 * | 11/2010 | Keely et al. | ..................... | 345/158 |
| 7,852,356 B2 * | 12/2010 | Takikawa et al. | ............. | 345/660 |
| 8,028,251 B2 * | 9/2011 | Park et al. | ..................... | 715/863 |
| 2005/0052427 A1 * | 3/2005 | Wu et al. | ....................... | 345/173 |

FOREIGN PATENT DOCUMENTS
CN 101046717 A 10/2007
* cited by examiner

*Primary Examiner* — Amare Mengistu
*Assistant Examiner* — Vinh Lam
(74) *Attorney, Agent, or Firm* — Altis Law Group, Inc.

(57) ABSTRACT

A touch screen region selecting method implemented by a central processing unit (CPU), wherein the touch screen senses and recognizes tracks of two line-drawing touches simultaneously performed thereon. The method comprises: receiving the two line-drawing touches and displaying two lines via the CPU, identifying start points and terminal points of the two lines via the CPU, connecting the start point and the terminal point of each line to generate a first line and a second line respectively via the CPU, connecting the start points of the two lines to generate a third line, and connecting the terminal points of the two lines to generate a fourth line via the CPU, identifying a region framed by the first line, the second line, the third line, and the fourth line, obtaining displayed contents, and performing an operation for the displayed contents via the CPU.

4 Claims, 2 Drawing Sheets

TOUCH SCREEN REGION SELECTING METHOD

BACKGROUND

1. Technical Field

The disclosure relates to a touch screen region selecting method.

2. Description of Related Art

In general, users can touch text or objects on a touch screen. The touch screen senses the touch and recognizes tracks of the operation to choose the text that was touched, and can further execute predetermined functions depending on a current mode of the touch screen and how the user touches the screen. The predetermined functions may include copy and cut for the chosen word. However, the touch screen cannot allow the user to select a region of text, which includes many words, according to the tracks of the operation.

Therefore, what is needed is a touch screen region selecting method.

DETAILED DESCRIPTION

Figure 1:
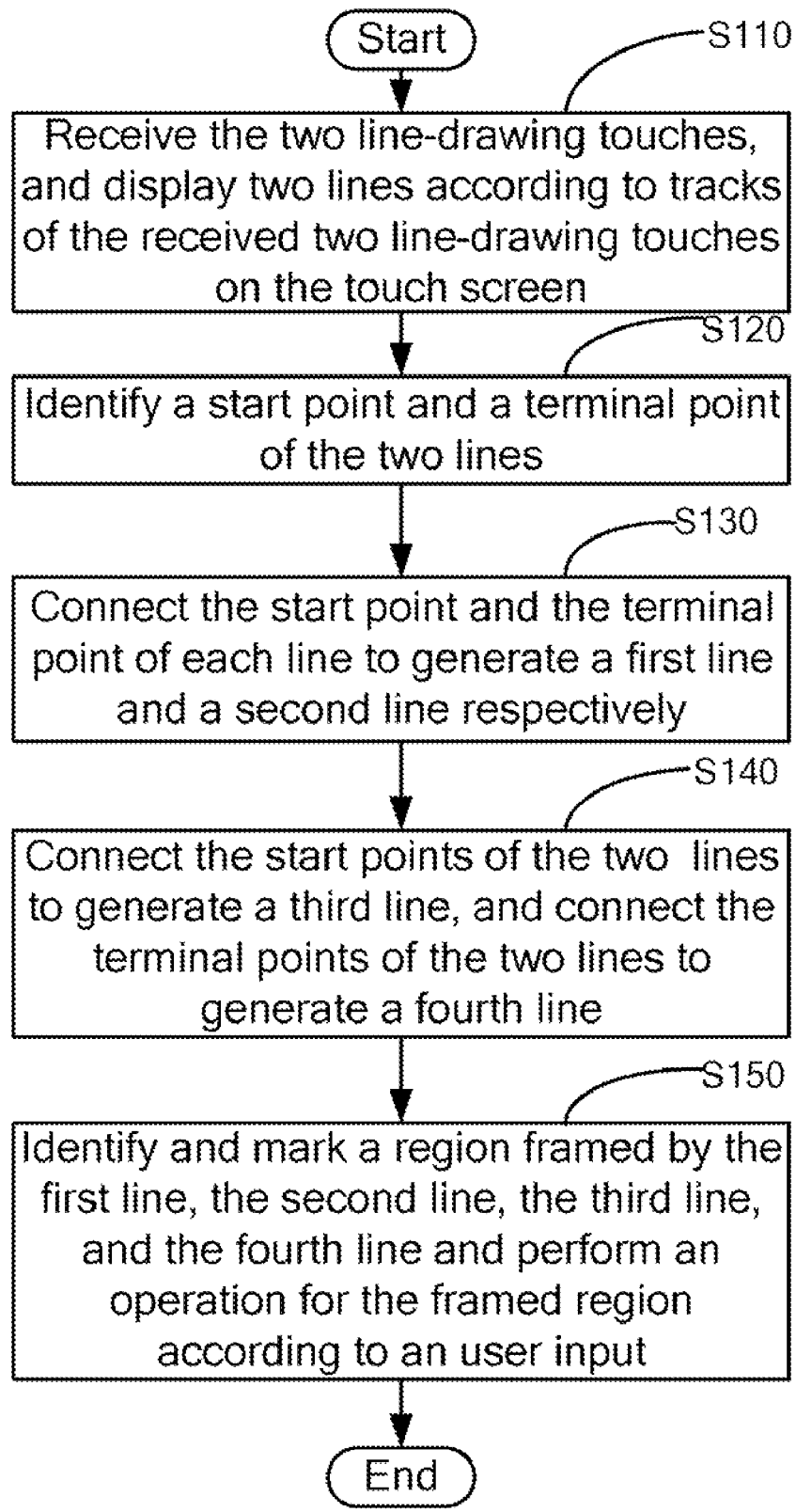
FIG. 1 is a flowchart of a touch screen region selecting method based on a touch screen implemented by a central processing unit (CPU) in accordance with one embodiment.

FIG. 1 is a flowchart of a region selecting method for on a touch screen 20 (shown in FIG. 2) implemented by a CPU 10 (shown in FIG. 2) in accordance with one embodiment.

The touch screen 20 senses and recognizes tracks of two line-drawing touches simultaneously performed on the touch screen 20. In one embodiment, a user touches the touch screen 20 with, for example two fingertips, then drags the touch across the touch screen 20 to draw two non-coincident lines and a region selecting function is activated upon release of the touch. The touch screen 20 is a multi-point touch screen which is capable of sensing and recognizing a plurality of touches simultaneously performed on the touch screen 20 and associating the touches with predetermined operations.

Figure 2:
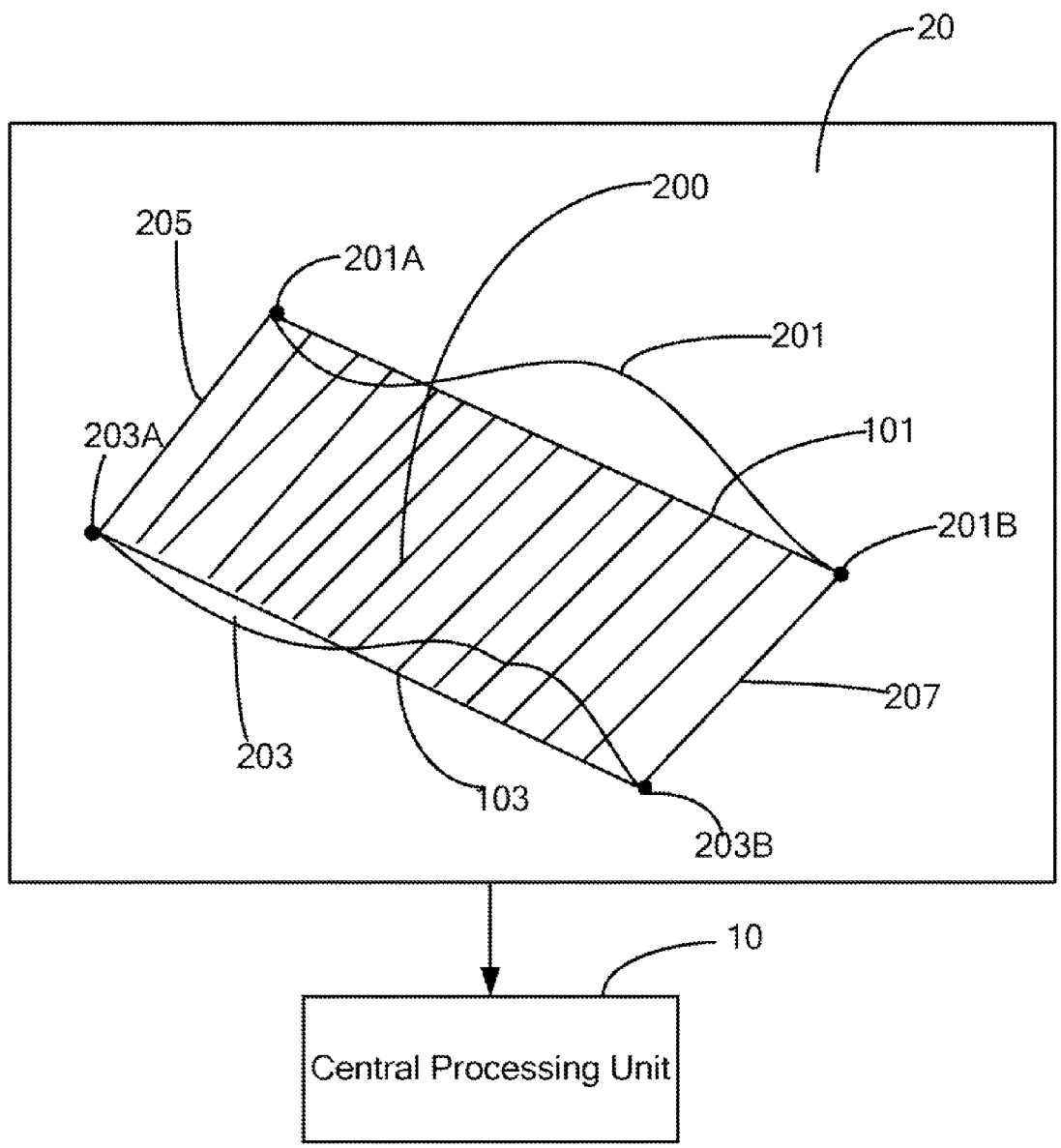
FIG. 2 is a schematic diagram showing a selected region on the touch screen in accordance with one embodiment.

In step S110, the CPU 10 receives the two line-drawing touches, and displays two lines 201, 203 (shown in FIG. 2) according to tracks of the received two line-drawing touches on the touch screen 20. As shown in FIG. 2, the CPU 10 receives two line-drawing touches on the multi-point touch screen 20, and displays the two lines 201, 203 on the multi-point touch screen 20 accordingly.

In step S120, the CPU 10 identifies a start point 201A, 203A and a terminal point 201B, 203B of the two lines. As shown in FIG. 2, the line 201 includes a start point 201A and a terminal point 201B; and the line 203 includes a start point 203A and a terminal point 203B.

In step S130, the CPU 10 connects the start point 201A, 203A and the terminal point 201B, 203B of each line 201, 203 to generate a first line 101 and a second line 103 respectively. As shown in FIG. 2, the CPU 10 connects the start point 201A and the terminal point 201B of the line 201 to generate the first line 101; and connects the start point 203A and the terminal point 203B of the line 203 to generate the second line 103.

In step S140, the CPU 10 connects the start points 201A, 203A of the two lines 201, 203 to generate a third line 205, and connects the terminal points 201B, 203B of the two lines 201, 203 to generate a fourth line 207. As shown in FIG. 2, the CPU 10 connects the start point 201A of the line 201 and the start point 203A of the line 203 to generate the third line 205; and connects the terminal point 201B of the line 201 and the terminal point 203B of the line 203 to generate the fourth line 207.

In step S150, the CPU 10 identifies and marks a region 200 framed by the first line 101, the second line 103, the third line 205, and the fourth line 207 and performs an operation for the identified region according to an user input. As shown in FIG. 2, the first line 101, the second line 103, the third line 205, and the fourth line 207 frames the region 200. The CPU 10 obtains displayed contents of the framed region 200 and performs an operation, such as copy or cut, for the displayed contents in the framed region 200, according to a user input. In one embodiment, the first line 101, the second line 103, the third line 205, and the fourth line 207 can be straight lines or predetermined types of curves, such as, sections of a parabola, and so on.

Although the present disclosure has been specifically described on the basis of the embodiment thereof, the disclosure is not to be construed as being limited thereto. Various changes or modifications may be made to the embodiment without departing from the scope and spirit of the disclosure.

What is claimed is:

1. A region selecting method for a touch screen implemented by a central processing unit (CPU), the method comprising:

providing the touch screen that senses and recognizes tracks of two line-drawing operations simultaneously imposed thereon;

receiving the two line-drawing touches and displaying two lines according to the tracks of the received two line-drawing touches on the touch screen via the CPU;

identifying start points and terminal points of the two lines via the CPU;

connecting the start point and the terminal point of each line to generate a first line and a second line respectively via the CPU;

connecting the start points of the two lines to generate a third line via the CPU, and connecting the terminal points of the two lines to generate a fourth line via the CPU;

identifying a region framed by the first line, the second line, the third line, and the fourth line, obtaining displayed contents in the framed region, and performing an operation for the displayed contents in the framed region according to a user input via the CPU.

2. The method as described in claim 1, wherein the touch screen is a multi-point touch screen which is capable of sensing and recognizing a plurality of touches simultaneously performed on the touch screen and associating the touches with predetermined operations.

3. The method as described in claim 1, wherein the first line, the second line, the third line, and the fourth line are straight lines.

4. The method as described in claim 1, wherein the first line, the second line, the third line, and the fourth line are predetermined curves.

* * * * *